United States Patent [19]
Tenkman

[11] 3,844,168
[45] Oct. 29, 1974

[54] TORQUE MEASURING APPARATUS

[75] Inventor: Robert Henry Tenkman, Cincinnati, Ohio

[73] Assignee: General Electric Company, Lynn, Mass.

[22] Filed: Aug. 3, 1973

[21] Appl. No.: 385,463

[52] U.S. Cl. ............................................. 73/136 A
[51] Int. Cl. ............................................. G01l 3/10
[58] Field of Search .................... 73/136 A; 324/174

[56] References Cited
UNITED STATES PATENTS

| | | | |
|---|---|---|---|
| 3,492,518 | 1/1970 | Wayne | 310/155 |
| 3,548,649 | 12/1970 | Parkinson | 73/136 A |
| 3,572,106 | 3/1971 | Jonas | 73/136 A |
| 3,626,225 | 12/1971 | Pauwels | 324/174 UX |
| 3,680,379 | 8/1972 | Boyd et al. | 73/231 R |

FOREIGN PATENTS OR APPLICATIONS

| | | | |
|---|---|---|---|
| 781,363 | 8/1957 | Great Britain | 324/174 |

Primary Examiner—Charles A. Ruehl

[57] ABSTRACT

An apparatus for measuring torque includes a torque shaft with a plurality of teeth disposed about the surface thereof wherein the spacing between the teeth is correlated to the actual torque applied to the shaft. A sensor is stationed apart from the teeth and provides an output signal indicative of each time one of the teeth rotates past the sensor whereupon this signal is then converted into a pulse train for triggering a bistable multivibrator. The average DC component of the output signal from the multivibrator is sensed to provide an accurate analog indication of the actual torque applied to the shaft whereupon there is further included a presetting means for presetting the multivibrator to a predetermined state upon the initiation of shaft rotation.

10 Claims, 3 Drawing Figures

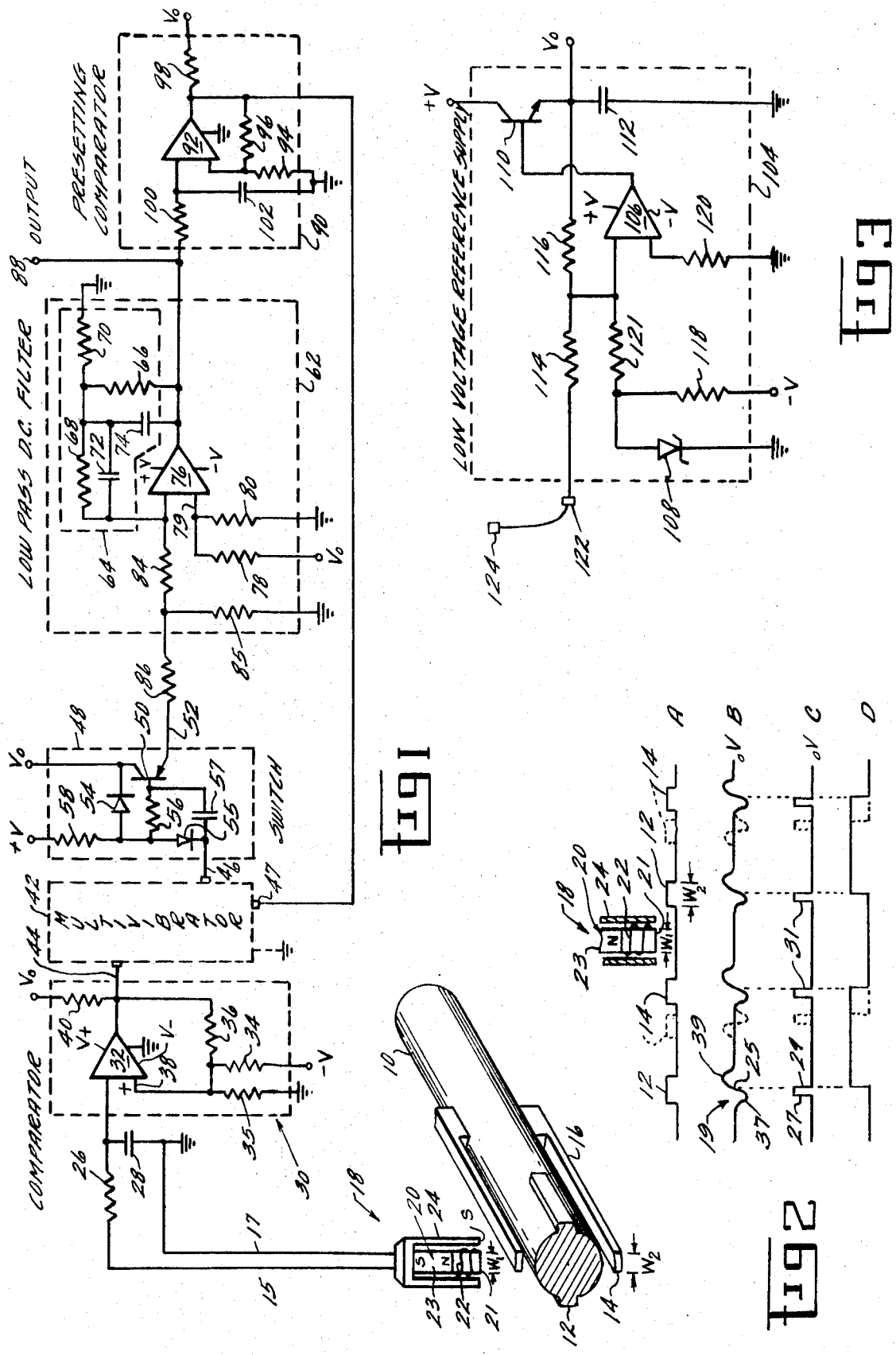

3,844,168

TORQUE MEASURING APPARATUS

BACKGROUND OF THE INVENTION

This invention relates generally to a torque measuring apparatus and, more particularly, to an apparatus for measuring torque of a type having a system of spaced apart teeth disposed about a torque shaft together with a single spaced apart sensor, the output of which is converted to an analog representation of the actual torque applied to the shaft. The invention herein described was made in the course of or under a contract or subcontract thereunder (or grant) with the Department of the Army.

Torque measuring apparatus of the type recently disclosed in U.S. Pat. No. 3,548,649 generally employ a torque shaft with two toothed exciter wheels wherein the teeth of one exciter wheel are positioned between the teeth of the opposing exciter wheel. One of the exciter wheels connects to one end of a sleeve with the opposing end of the sleeve connecting to the shaft such that the application of torque to the shaft operates to twist the shaft and displace the phasing between the exciter wheel teeth. A sensor is positioned in close proximity to the teeth so as to provide an output signal indicative of each time one of the teeth rotate past the sensor.

It is suggested that the output signal from the sensor approximate a sine wave, each complete cycle of which is representative of the rotation of a tooth past the sensor with the zero volt crossover point of the cycle being indicative of direct alignment between a tooth and the sensor. The zero crossover points are in turn converted into pulses which trigger a bi-stable multivibrator, the output signal of which must be integrated by dual integrating amplifiers because the signal may have either a positive or a negative DC voltage component depending upon the state of the multivibrator upon initiation of shaft rotation. A discriminator must then be included to detect the largest absolute voltage from the dual integrating amplifiers in order to provide an analog indication of torque.

The disadvantages of the above described system are many fold. First, if the output signal from the sensor approximates a sine wave, as suggested by the prior art, with little or no spacing between adjacent cycles for the zero torque situation, then an increase in torque will operate to shift adjacent cycles of the sine wave into each other and result in an overall distortion of the zero crossover points. If the zero crossover points become distorted so as to no longer indicate actual alignment between respective teeth and the sensor, then an accurate analog indication of torque can no longer be maintained.

Another disadvantage relates to the additional circuitry, e.g. dual integrating amplifiers and a DC discriminator, which are required because the initial state of the multivibrator upon shaft rotation cannot be predetermined and may provide an analog output signal having either a positive or negative DC component. Whereas torque sensing systems are required for gas turbine engines, the addition of dual integrating amplifiers and a DC discriminator unnecessarily adds to the overall engine complexity and may therefore adversely affect system reliability.

Still another disadvantage, which would also be particularly acute in the case of a gas turbine engine, relates to the variations in temperature to which the torque shaft may be subjected during normal operation. Such variations in the temperature of the torque shaft operate to change the spring constant of the shaft which in turn changes the phasing between the teeth for the same amount of torque. The output analog indication of torque is therefore dependent upon the torque shaft temperature and may become inaccurate with variations in temperature.

Therefore it is a primary object of this invention to provide a simple and accurate torque measuring apparatus which overcomes the above described disadvantages of prior art torque measuring systems.

It is also an object of this invention to provide a torque measuring apparatus wherein the sensor and tooth are specially arranged to eliminate distortion of the zero crossover points with increasing torque.

It is a further object of this invention to provide a torque measuring apparatus wherein a multivibrator may be utilized without the addition of dual integrating amplifiers or a DC discriminator.

It is an even further object of this invention to provide a torque measuring apparatus, the output of which remains relatively impervious to changes in temperature which alter the spring constant of the rotating shaft.

SUMMARY OF THE INVENTION

Briefly stated, the above and other related objects are attained by providing a shaft torque measuring apparatus having a torque shaft with a plurality of circumferentially spaced apart teeth disposed about the surface thereof. Adjacent teeth are in fixed axially displaced connection to the shaft such that the application of torque to the shaft operates to twist the shaft and change the spacing between adjacent teeth. A variable reluctance type sensor is stationed in spaced apart relation to the shaft to provide an output signal waveform indicative of each time one of the teeth rotate past the sensor. The sensor includes a core with an outer casing therearound having a magnetic polarity opposed to that of a pole piece so as to shield the sensor in order that only one tooth can be sensed at a time with the output signal waveform returning to a zero potential baseline for a limited period between adjacent teeth.

There is also included a comparator which receives the output signal from the sensor and provides an output pulse train, each pulse of which corresponds to the rotation of a tooth past the sensor. A bi-stable multivibrator then receives the primary pulse train from the comparator and changes state between a high and low output signal upon receipt of each primary pulse from the primary pulse train. A DC filter next receives the output signal from the multivibrator and provides an average DC output signal which is an analog indication of the actual torque applied to the shaft.

A presetting comparator receives the output signal from the DC filter and provides a preset input signal back to the multivibrator interrupting the primary pulse train to the multivibrator and causing the multivibrator to change to a predetermined state so as to assure that the average DC output signal from the DC filter remains at a predetermined polarity regardless of the state of the multivibrator upon initiation of shaft rotation.

DESCRIPTION OF THE DRAWINGS

While the specification concludes with a series of claims which particularly point out and distinctly claim the subject matter which Applicant regards as his invention, a complete understanding of the invention will be gained from the following description of a preferred embodiment. This description is given in connection with the accompanying drawings in which:

FIG. 1 is a schematic representation of the torque measuring apparatus of this invention.

FIG. 2 shows the signal wave forms at various stages along the torque measuring apparatus of FIG. 1 as referenced to the rotation of a torque shaft past a sensor.

FIG. 3 shows a low voltage reference supply which compensates the torque measuring apparatus of FIG. 1 for variations in shaft temperature.

DESCRIPTION OF THE PREFERRED EMBODIMENT

Referring now to FIG. 1, there is shown a torque shaft 10, as may be used in a gas turbine engine or otherwise, having a plurality of axially extending and circumferentially spaced apart magnetic teeth 12 disposed in fixed connection to the torque shaft 10. A second plurality of axially extending magnetic teeth 14 are also circumferentially disposed about the torque shaft 10 in interspaced relation between the teeth 12. The second plurality of teeth 14 are spaced radially apart from the torque shaft 10 and integrally connect to extensions 16 which are also spaced radially apart from the torque shaft 10. The extensions 16 extend axially beyond the length of the teeth 12 and thereafter connect to the torque shaft 10 such that a slight twist in the shaft 10, as may result from the application of torque thereto, causes a change in the relative positions of the teeth 12 and 14 to each other. It will be well understood by those of ordinary skill in the art that the extensions 16 may be interconnected in the form of a cylindrical sleeve spaced apart from the torque shaft 10 wherein one end of the sleeve is attached to the shaft 10 and the opposing end of the sleeve is integrally connected to the plurality of spaced apart teeth 14 as fully disclosed in U.S. Pat. No. 3,548,649.

A variable reluctance type pickup sensor 18 is positioned in close spaced apart proximity to the teeth 14, 16 so as to provide an output signal waveform indicative of each time one of the teeth, 12 or 14, rotate past the sensor 18. The pickup sensor 18 includes a magnetic core 20 having a soft ferromagnetic tip or pole piece 21 around which pickup leads 15, 17 are wound to form a coil 22. Attached to the pole piece 21 is a bar magnet 23 which by nature has both a north and south pole. A cylindrical casing 24 may be provided around the core 20 to shield the sensor 18 so that only one tooth, 12 or 14, can be sensed at a time, the importance of which will be made more obvious from the following discussion. The casing 24 may also be made of a soft ferro-magnetic material which is magnetically coupled to the south pole end of the bar magnet 23 to provide a magnetic south pole shield around the magnetic north pole of the pole piece 21.

Referring now to FIG. 2, in conjunction with FIG. 1, there is shown at B the output voltage signal waveform from the sensor 18 as correlated to the rotation of the teeth 12 and 14 past the sensor 18. As is readily apparent, a pulse 19 is generated each time one of the teeth 12 or 14 rotate past the sensor 18. Each pulse 19 includes a negative extending portion 37 and a positive extending portion 39 together with a zero volt crossover point 25 therebetween. A zero volt crossover point 25 occurs only when a tooth 12 or 14 is in direct alignment with the sensor core 20. Therefore, the zero crossover points 25 are the critical points for torque detection because they are not displaced in time as a result of a change in the signal amplitude. In order that the zero volt crossover points 25 be clearly determinable, it is necessary that the width $W_1$ of the pole piece 20 be made equal to or greater than the width $W_2$ of the teeth 12 and 14. In this manner, the slope of the waveform B will remain steep at the zero volt crossover points 25 so that there can be no doubt as to the precise locations where the waveform B crosses over the zero baseline voltage. If the width $W_2$ of the teeth 12 and 14 were made large in comparison to the width $W_1$ of the sensor core 20, there would be a reduction in the slope of the curve B at the zero volt crossover points 25, thus reducing the accuracy at which the crossover points could be determined.

Also, it has been found that the spacing between the teeth 12 and 14 must be sufficient for the output pulses 19 to remain continuously spaced apart with the output signal waveform B always returning to the zero volt baseline for a limited period between adjacent pulses 19. This requirement must be continuously maintained even during the shaft in the spacing between the pulses 19 as occasioned by the twisting of the torque shaft 10 during the application of torque. Otherwise, the shift of one pulse 19 into an adjacent pulse could have an overall distorting influence upon the zero volt crossover points 25 as previously discussed. For this reason also, the magnetic casing 24 is preferably provided around the sensing core 20 in order to operate as a shield so that each tooth 12 and 14 may be sensed individually and thereby generate an output signal waveform B of independent and distinct pulses 19 which are spaced apart so as not to interfere with each other.

For the unloaded situation where the shaft 10 is rotated with substantially no torque applied thereto, there will be little or no twisting of the shaft. Therefore, the spacing between the teeth 12 and 14 will remain substantially equidistant and provide the solid line output pulse waveform B as shown in FIG. 2. Unwanted high frequency components carried with the output signal waveform B from the sensor 18 may be eliminated by a filter comprising a resistor 26 and a capacitor 28. The filtered waveform is then connected to a comparator circuit 30 which includes an operational amplifier 32 together with a pullup resistor 40 and a series of positive feedback resistors 34, 35 and 36. The resistor 40 is biased by a reference supply voltage, Vo, furnished from a low voltage reference supply as shown in FIG. 3, the details of which will be more fully described in the discussion below. Input terminal 38 to the operational amplifier 32 is biased slightly negative by the resistors 34, 35 and 36 in order to prevent a false triggering of the comparator when the input signal from the sensor 18 is at its zero volt base line. The output voltage from the comparator 30 is normally low and may substantially approximate the zero base line voltage when the input signal from the sensor 18 is at its zero volt base line. When the input signal from the sensor 18 dips below the negative bias at input terminal 38, the output voltage at 44 is pulled upward by the resistor 40, whereupon the input terminal 38 becomes biased at precisely the zero volt base line. When the negative portion 21 of the pulse 19 approaches the zero volt crossover point 25, the output voltage at 44 again switches to the original low voltage providing the solid line output signal pulse train C as shown in FIG. 2. Each pulse 31 of the pulse train C has a positively sloped leading edge 27 corresponding to the instant the negative portion 37 of the pulse 19 dips below the negative bias voltage at input terminal 38, together with a negatively sloped trailing edge 29 which corresponds directly with the zero volt crossover point 25.

A bi-stable, multivibrator 42 receives the input pulse train C and is triggered to a change of state by the negatively sloped trailing edge 29 of each pulse 31. With each change of state, the output voltage at 46 from the multivibrator 42 switches between a high and a low value to form the solid line output square wave as shown at D in FIG. 2. A preset input is provided for the multivibrator 42 at 47 whereby a negative preset voltage will cause the output voltage at 46 to go low independent of the input voltage at 44. The exact operation of the preset 47 will become more apparent from the discussion below.

The output square wave form from the multivibrator 42 connects to a switch 48 which includes a chopper transistor 50 biased through resistors 56 and 58. Diodes 54 and 55 are also included in the switch 48 to prevent an over-voltage of the multivibrator 42. There is further included a speed-up capacitor 57 between the input at 46 to the switch 48 and the base of transistor 50. When the input voltage to switch 48 is low, transistor 50 turns on and the voltage drop from emitter to collector across transistor 50 approximates zero volts with the output voltage at 52 approximating the reference supply voltage, $V_o$. When the input voltage to the switch 48 becomes high, transistor 50 turns off and disconnects the output at 52 which then floats.

The output signal from the switch 48 connects to a low pass DC filter 62 through interconnecting resistors 84, 85, and 86. Filter 62 includes a DC operational amplifier 76 with a long time constant determined by a double break filter 64 having three resistors 66, 68 and 70, together with two capacitors, 72 and 74. Resistors 86 and 70 are respectively selected to determine gain and voltage offset at output terminal 88. Resistors 78 and 80 are provided to bias input terminal 79 of the operational amplifier 76 between the reference supply voltage $V_o$ and circuit common. The effective torque sensitivity of the DC filter 62 may therefore be varied by changing the reference supply voltage $V_o$ since the magnitude of the average DC output voltage is a direct function of the value of the reference supply voltage $V_o$ times the time interval during which it is switched on minus $V_o$ times the time interval during which it is switched off.

When shaft 10 revolves with substantially zero torque, the teeth 12 and 14 remain equidistant apart and the switch 48 turns on to apply the reference supply voltage $V_o$ at 52 for exactly half the time. The output voltage 52 is therefore also disconnected from the reference supply voltage $V_o$ and floats for the remaining half of the time interval. Under these conditions, the average DC output voltage from the filter 62 at output terminal 88 remains zero and provides an analog indication of zero torque applied to the shaft 10.

An increase in the torque applied to the shaft 10 operates to twist the shaft and offset the equidistant spacing between the teeth 12 and 14, as represented by the phantom teeth in graph A of FIG. 2. Referring now to the phantom output signal waveform B, it can be seen that the change in spacing between the teeth 12 and 14 affects a corresponding change in the spacing between the sensed pulses 19 and their zero crossover points 25. The shift in time interval between the pulses 19, in turn, affects a corresponding shift in time intervals between the output pulses 31 of the pulse train C from the comparator 30. The multivibrator 42 is therefore triggered to change state an uneven intervals providing the output signal at 46 as represented by the phantom waveform D in FIG. 2. The output waveform D from the multivibrator 42 is then switched between the positive reference supply voltage $V_o$ and open circuit by the switch 48, thereby enabling the low pass DC filter 62 to provide an average DC output voltage at terminal 88 which is an accurate analog indication of the actual torque applied to shaft 10. Conceptually, it would be possible to eliminate the switch 48; however, the analog output voltage at terminal 88 would suffer in precise accuracy due to the variation in the peak to peak voltages of the output signal waveform from the multivibrator 42 caused by circuit component ambient temperature variation.

The analog output voltage at terminal 88 which is indicative of the torque applied to shaft 10 may be either plus or minus depending upon the initial state of the multivibrator 42 when the shaft 10 is first rotated. In order to insure a uniform polarity for the output signal at terminal 88, without adding dual amplifiers or a DC discriminator, there is provided a presetting comparator 90 which has an operational amplifier 92 with positive feedback provided by the resistors 94 and 96. A low pass filter having a resistor 100 and capacitor 102 is also provided to limit the voltage ripple input to the operational amplifier 92. The output signal from the presetting comparator 90 is directed back to the multivibrator 42 at the present input 47, and operates to interrupt the input signal waveform at 44 causing the multivibrator to change to the negative state. For the particular embodiment herein described, the multivibrator 42 is arranged to change to a negative output state whenever the input signal at preset 47 goes to a positive value regardless of the input signal waveform at 44. In this manner, the analog output signal at terminal 88 always remains negative regardless of the state of the multivibrator 42 upon the initiation of torque shaft 10 rotation. The presetting comparator 90 thereby eliminates the need for either dual amplifiers or an absolute value detector as would otherwise be needed.

Referring now to FIG. 3, there is shown a low voltage reference supply 104 which provides the output reference voltage $V_o$. The reference supply 104 includes an operational amplifier 106 connected to a reference compensated Zenor diode 108 and an output drive transistor 110. There is also included a filter capacitor 112, together with a feedback resistor 116, all of which are biased by the resistors 114, 118, 120 and 121. A DC input voltage is applied to terminal 122 and varies with change in temperature of the torque shaft 10 in order to compensate for the change in spring constant of the shaft with changing temperature. The DC voltage at terminal 122 may be an amplified DC voltage received from a thermocouple 124, stationed in proximity to the torque shaft 10 so as to sense any change in temperature of the shaft. The output reference supply voltage $V_o$ varies as the result of changes in the input voltage at terminal 122 so as to adjust the gain of the low pass DC filter 62 without offsetting the zero torque output signal at terminal 88. Because the spring constant of the shaft 10 generally decreases with rising temperature, it is important that the gain of the low pass DC filter 62 be adjusted accordingly so as to compensate for the changes in shaft twist with variations in temperature.

It will be understood by those of ordinarily skill in the art that various changes could be made in the above described circuitry without departing from the broader aspects of this invention. For example, the various signal, reference, and magnetic polarities herein described are only arbitrarily established for the purposes of illustration and may be readily reversed without affecting the fundamental operation of the above described circuits. It will also be understood that in concept, the switch 48 could be by-passed if a decrease in the degree of accuracy of the analog output voltage at terminal 88 could be accepted. Therefore, having above described further embodiments of the invention, though not exhaustive of all possible equivalents, what is desired to be secured by Letters Patent is distinctly claimed and particularly pointed out in the claims appearing below.

What is claimed is:

1. A torque measuring apparatus comprising:
   a torque shaft having a plurality of circumferentially spaced apart teeth disposed about the surface thereof with adjacent teeth in fixed axially displaced connection to the shaft such that the application of torque to the shaft operates to twist the shaft and change the spacing between adjacent teeth;
   a sensor stationed in fixed spaced apart relation to the shaft to provide an output signal waveform indicative of each time one of the teeth rotate past the sensor;
   a comparator which receives the output signal from the sensor and provides a primary output pulse train, each primary pulse of which corresponds to the rotation of a tooth past the sensor;
   a bi-stable multivibrator which receives the primary pulse train from the comparator and changes state between a high and low output signal upon receipt of each primary pulse from the primary pulse train;
   a DC filter which receives the output signal from the multivibrator and provides an average DC output signal which is an analog indication of the actual torque applied to the shaft;
   and a presetting comparator which receives the output signal from the DC filter and provides a preset input signal back to the multivibrator interrupting the primary pulse train to the multivibrator and causing the multivibrator to change to a predetermined state so as to assure that the average DC output signal from the DC filter remains at a predetermined polarity regardless of the state of the multivibrator upon initiation of shaft rotation.

2. The torque measuring apparatus of claim 1 including a switch in serial connection between the multivibrator and DC filter wherein a change in state of the output signal from the multivibrator operates to switch the output signal from the switch to the DC filter between a reference supply potential and open circuit.

3. The torque measuring apparatus of claim 2 wherein the output signal waveform from the sensor generates a secondary pulse each time one of the teeth rotate past the sensor and each secondary pulse includes a negative extending portion and a positive extending portion together with a zero potential crossover point therebetween corresponding to direct alignment between a tooth and the sensor, and the comparator includes an operational amplifier having two input erminals, the first of which receives the input signal from the sensor and the second of which is biased slightly negative through positive feedback resistors to prevent a false triggering of the comparator, wherein a dip in the level of the input signal from the sensor below the negative bias operates to switch the level of the output signal from the comparator and bias the first input terminal to the operational amplifier at the zero potential baseline such that a return in the level of the input signal from the sensor back to the zero potential baseline operates to again switch the level of the output signal from the comparator back to its initial value, said instant of comparator switch back to its initial value being indicative of direct alignment between the sensor and a tooth, and further triggering a change of state in the multivibrator.

4. The torque measuring apparatus of claim 2 wherein:
   the DC filter is of the low pass type and includes a DC operational amplifier with a long time constant determined by a double break filter and wherein one input terminal to the DC operational amplifier is biased from the reference supply potential, the value of which determines the effective torque sensitivity of the low pass DC filter without offsetting the analog indication for zero torque.

5. The torque measuring apparatus of claim 2 wherein: the presetting comparator includes an operational amplifier having positive feedback together with a low pass filter limiting the voltage ripple input to the operational amplifier.

6. The torque measuring system of claim 2 including a low voltage reference supply which receives a variable input voltage representative of a changing temperature of the shaft and thereafter furnishes the reference supply potential which varies as a function of the variable input voltage and adjusts the effective torque sensitivity of the DC filter without offsetting the zero torque output signal so as to compensate for changes in the shaft spring constant with variations in temperature.

7. The torque measuring system of claim 6 wherein the low voltage reference supply receives the variable input voltage representative of changing temperature from a thermocouple stationed in proximity to the shaft;
   and the low voltage reference supply includes an operational amplifier connected to a reference compensated zenor diode and an output drive transistor, further including a filter capacitor together with a feedback resistor.

8. A torque measuring apparatus comprising:
   a torque shaft having a plurality of circumferentially spaced apart teeth disposed about the surface thereof with adjacent teeth in fixed axially displaced connection to the shaft, such that the application of torque to the shaft operates to twist the shaft and change the spacing between adjacent teeth;

a variable reluctance type pickup sensor stationed in spaced apart relation to the shaft to provide an output signal waveform indicative of each time one of the teeth rotates past the sensor wherein the sensor includes a core with a pole piece together with an outer casing therearound having a magnetic polarity opposed to that of the pole piece so as to shield the sensor in order that only one tooth can be sensed at a time with the output signal waveform returning to a zero potential baseline for a limited period between adjacent teeth;

and conversion means for converting the output signal from the pickup sensor to an analog representation of the actual torque applied to the shaft wherein the conversion means include:

a comparator which receives the output signal from the sensor and provides an output pulse train, each pulse of which corresponds to the rotation of a tooth past the sensor;

a bi-stable multivibrator which receives the output pulse train from the comparator and changes state between a high and low output signal upon receipt of each pulse from the pulse train;

a DC filter which receives the output signal from the multivibrator and provides an average DC output signal which is an analog indication of the actual torque applied to the shaft, and a presetting comparator which receives the output signal from the DC filter and provides a preset input signal back to the multivibrator interrupting the pulse train to the multivibrator and causing the multivibrator to change to a predetermined state so as to assure that the average DC output signal from the DC filter remains at a predetermined polarity regardless of the state of the multivibrator upon initiation of shaft rotation.

9. The torque measuring apparatus of claim 8 wherein the spacing between adjacent teeth is sufficient so that only one tooth is sensed at a time with the output signal waveform returning to the zero potential baseline for a limited period between adjacent teeth regardless of the amount of shaft twist received through the application of torque to the shaft.

10. The torque measuring system of claim 9 including a low voltage reference supply which receives a variable input voltage representative of a changing temperature of the shaft and thereafter furnishes a reference supply potential to the conversion means wherein the reference supply potential varies as a function of the variable input voltage and adjusts the gain of the conversion means without offsetting the zero torque output signal so as to compensate for changes in the shaft spring constant with variations in temperature.

* * * * *